US011535105B2

(12) United States Patent  
Baumgardner et al.

(10) Patent No.: US 11,535,105 B2  
(45) Date of Patent: Dec. 27, 2022

(54) ADAPTIVE CONTROL OF TRANSPORT CLIMATE CONTROL SYSTEM BASED ON AVAILABLE ENERGY

(71) Applicant: THERMO KING LLC, Minneapolis, MN (US)

(72) Inventors: Grant A. Baumgardner, Minneapolis, MN (US); Grant Ovsak, Hopkins, MN (US)

(73) Assignee: THERMO KING LLC, Minneapolis, MN (US)

( * ) Notice: Subject to any disclaimer, the term of this patent is extended or adjusted under 35 U.S.C. 154(b) by 285 days.

(21) Appl. No.: 16/678,643

(22) Filed: Nov. 8, 2019

(65) Prior Publication Data  
US 2021/0138907 A1 May 13, 2021

(51) Int. Cl.  
*H02J 7/14* (2006.01)  
*B60L 1/00* (2006.01)  
*B60L 58/12* (2019.01)  
*B60L 1/04* (2006.01)  
*H01M 10/42* (2006.01)

(52) U.S. Cl.  
CPC ............ *B60L 1/003* (2013.01); *B60L 1/04* (2013.01); *B60L 58/12* (2019.02); *H01M 10/4257* (2013.01); *B60L 2240/34* (2013.01); *H01M 2010/4271* (2013.01); *H01M 2220/20* (2013.01)

(58) Field of Classification Search  
None  
See application file for complete search history.

(56) References Cited

U.S. PATENT DOCUMENTS

| | | | |
|---|---|---|---|
| 6,223,546 B1 | 5/2001 | Chopko et al. |
| 8,000,858 B2 | 8/2011 | Tonegawa et al. |
| 9,024,579 B2 | 5/2015 | Igata |
| 9,024,586 B2 | 5/2015 | Vance et al. |
| 9,627,902 B2 | 4/2017 | Kamishima |
| 10,107,536 B2 | 10/2018 | Senf, Jr. et al. |

(Continued)

FOREIGN PATENT DOCUMENTS

| | | |
|---|---|---|
| EP | 2679418 | 1/2014 |
| EP | 2031443 | 5/2016 |

(Continued)

OTHER PUBLICATIONS

Extended European Search Report, issued in the corresponding European patent application No. 20206495.2, dated Apr. 9, 2021, 8 pages.

*Primary Examiner* — Arun C Williams  
(74) *Attorney, Agent, or Firm* — Hamre, Schumann, Mueller & Larson, P.C.

(57) ABSTRACT

Technologies described herein are directed to the prioritized delivery of energy to primary and accessory electrical components associated with a vehicle that is at least partially electrically powered, as well as to a power source of the vehicle itself. To operate accessory electrical components in parallel to delivering power to a vehicle battery, the embodiments described herein facilitate understanding dynamic energy available to the accessory electrical components as well as the vehicle battery, and then managing the usage of energy in a prioritized manner to optimize the whole system performance that is aligned with user priorities with regards to energy availability and energy needs.

18 Claims, 8 Drawing Sheets

(56) References Cited

U.S. PATENT DOCUMENTS

| | | |
|---|---|---|
| 10,112,487 B1 | 10/2018 | Lee et al. |
| 10,317,119 B2 | 6/2019 | Zou |
| 10,369,896 B2 | 8/2019 | Namuduri et al. |
| 2005/0001431 A1 | 1/2005 | Sauer et al. |
| 2006/0053814 A1 | 3/2006 | Naik et al. |
| 2007/0212598 A1* | 9/2007 | Iida .................... H01M 10/486 429/62 |
| 2008/0116830 A1 | 5/2008 | Gonzalez et al. |
| 2010/0271172 A1 | 10/2010 | Takikita |
| 2011/0213983 A1 | 9/2011 | Staugaitis et al. |
| 2014/0049216 A1 | 2/2014 | Nakagawa et al. |
| 2015/0298680 A1 | 10/2015 | Matthews |
| 2017/0072813 A1 | 3/2017 | Martin et al. |
| 2017/0136911 A1* | 5/2017 | Ricci ....................... B60L 55/00 |
| 2018/0065446 A1 | 3/2018 | Hansson et al. |
| 2018/0273018 A1 | 9/2018 | Follen et al. |
| 2019/0183438 A1 | 6/2019 | Lee et al. |
| 2019/0184483 A1 | 6/2019 | Lee et al. |
| 2019/0193523 A1 | 6/2019 | Takeuchi et al. |
| 2019/0291665 A1 | 9/2019 | Martin |

FOREIGN PATENT DOCUMENTS

| | | |
|---|---|---|
| JP | 6351301 | 7/2018 |
| WO | 2006132070 | 12/2006 |
| WO | 2010/002644 | 1/2010 |
| WO | 2010009502 | 1/2010 |
| WO | 2010094302 | 8/2010 |
| WO | 2010145971 | 12/2010 |
| WO | 2011/078109 | 6/2011 |
| WO | 2014/002244 | 1/2014 |

* cited by examiner

ADAPTIVE CONTROL OF TRANSPORT CLIMATE CONTROL SYSTEM BASED ON AVAILABLE ENERGY

FIELD

The technologies disclosed and recited herein pertain generally to delivering power to primary and accessory electrical components associated with a vehicle that is at least partially electrically powered, as well as to a power source of the vehicle itself.

BACKGROUND

A transport climate-controlled system is generally used to control environmental condition(s) (e.g., temperature, humidity, air quality, and the like) within a climate-controlled space of a transport unit (e.g., a truck, a container (such as a container on a flat car, an intermodal container, etc.), a box car, a semi-tractor, a bus, or other similar transport unit). The transport climate-controlled system may include, for example, a transport refrigeration system (TRS) and/or a heating, ventilation and air conditioning (HVAC) system. The TRS may control environmental condition(s) within the climate-controlled space to maintain cargo (e.g., produce, frozen foods, pharmaceuticals, etc.). The HVAC system may control environmental conditions(s) within the climate-controlled space to provide passenger comfort for passengers travelling in the transport unit. In some transport units, the transport climate-controlled system may be installed externally (e.g., on a rooftop or under mount of the transport unit, on a front wall of the transport unit, etc.).

SUMMARY

The embodiments described herein are directed to the prioritized delivery of energy to primary and accessory electrical components associated with a vehicle that is at least partially electrically powered, as well as to a power source of the vehicle itself.

To operate one or more of accessory electrical components in parallel to delivering power to a vehicle battery, via a power distribution unit, the embodiments described, recited, and suggested herein facilitate understanding dynamic energy available to the accessory electrical components as well as the vehicle battery, and then distributing energy in a prioritized manner to optimize the system for a more efficient energy delivery process, with regards to user preference, energy availability, and energy needs.

As defined herein, an accessory electrical component is an electrically powered accessory configured to be used with at least one of a vehicle, trailer, and a transport container.

In accordance with at least one embodiment, a computer-readable medium stores executable instructions that may cause an energy distribution controller, which is electrically connected to both an energy source and an electrical system, to render efficient energy allocation for the electrical system. The instructions cause the controller to perform functions that include: receiving energy requirements for the electrical system under various conditions; receiving information indicating energy available from the energy source; and determining modes of operation for the electrical system for each of the various conditions that correspond the information indicating energy available and the energy requirements for the electrical system under each of the various conditions.

In accordance with at least one other embodiment, a computer-readable medium stores executable components that, upon execution, cause an energy distribution controller, which is electrically connected to both an energy source and an electrical system, to render efficient energy allocation for the electrical system. The executable components include a source meter that determines amounts of energy that is available from the energy source; a system cache that stores energy requirements for the electrical system under various conditions; a mode control unit that determines modes of operation for the electrical system under each of the various conditions; and an activation unit that activates one of the determined modes of operation for the electrical system.

In accordance with at least one other embodiment, an energy distribution controller is connected to both an energy source and an electrical system that includes a battery of a vehicle that is at least partially re-chargeable and a climate control unit that is used in a transport climate-controlled system that provides climate control to at least one of an internal space of the vehicle. The controller performs a method that includes: receiving energy requirements for the battery and the climate control unit under various conditions; receiving information indicating energy available from the energy source; and determining modes of operation for the battery and the climate-controlled system under each of the various conditions. The modes of operation include, at least, one that prioritizes allocation of energy to the battery over allocation of energy to the climate-controlled system unit at least some of the various conditions, and another that prioritizes allocation of energy to the climate-controlled system over allocation of energy to the battery.

DRAWINGS

References are made to the accompanying drawings that form a part of this disclosure and which illustrate embodiments described in this specification. Various changes and modifications will become apparent to those skilled in the art from the following detailed description. The use of the same reference numbers in different figures indicates similar or identical items.

Figure 2:
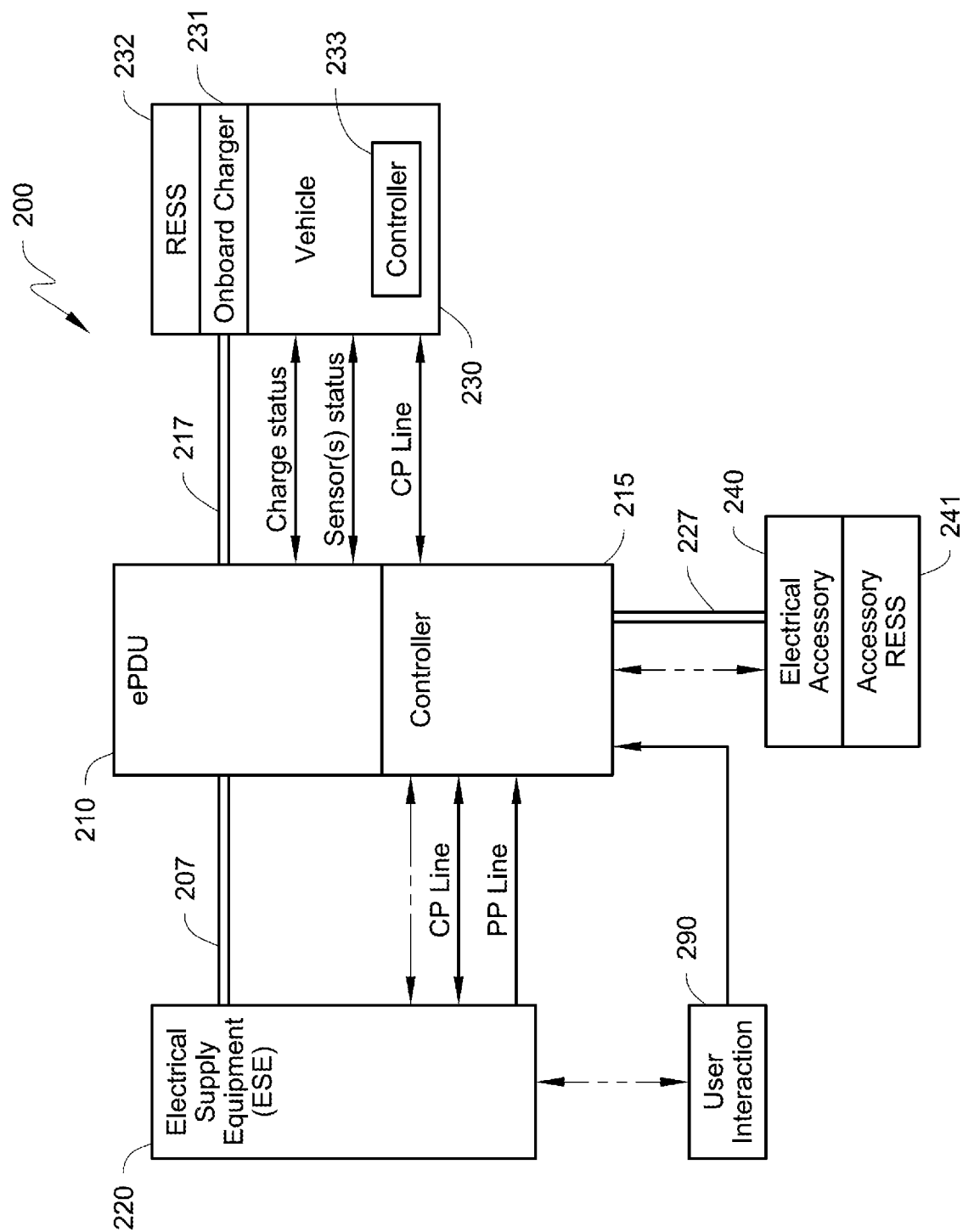

FIG. 2 schematically illustrates an energy management system for a transport climate control system, in accordance with at least one embodiment described herein.

Figure 3:
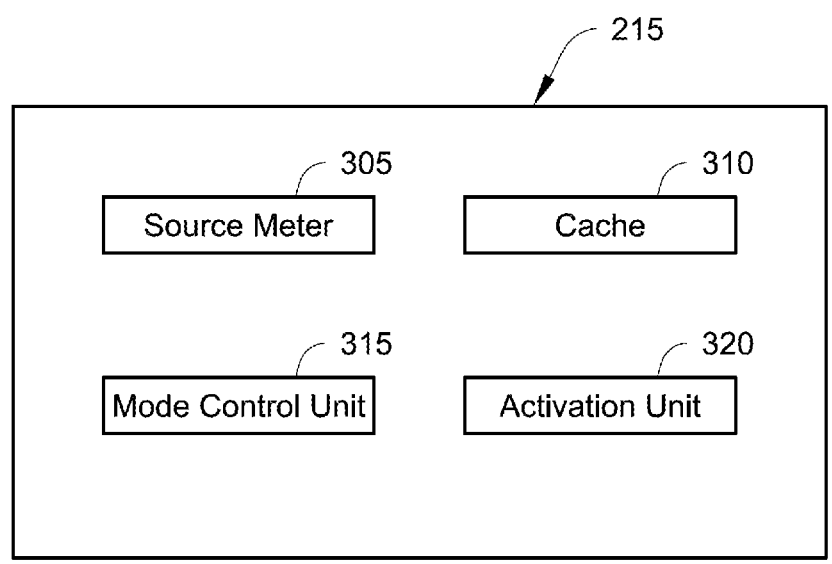

FIG. 3 illustrates a block diagram representing components of a controller corresponding to an energy management system, in accordance with at least one embodiment described herein.

Figure 4:
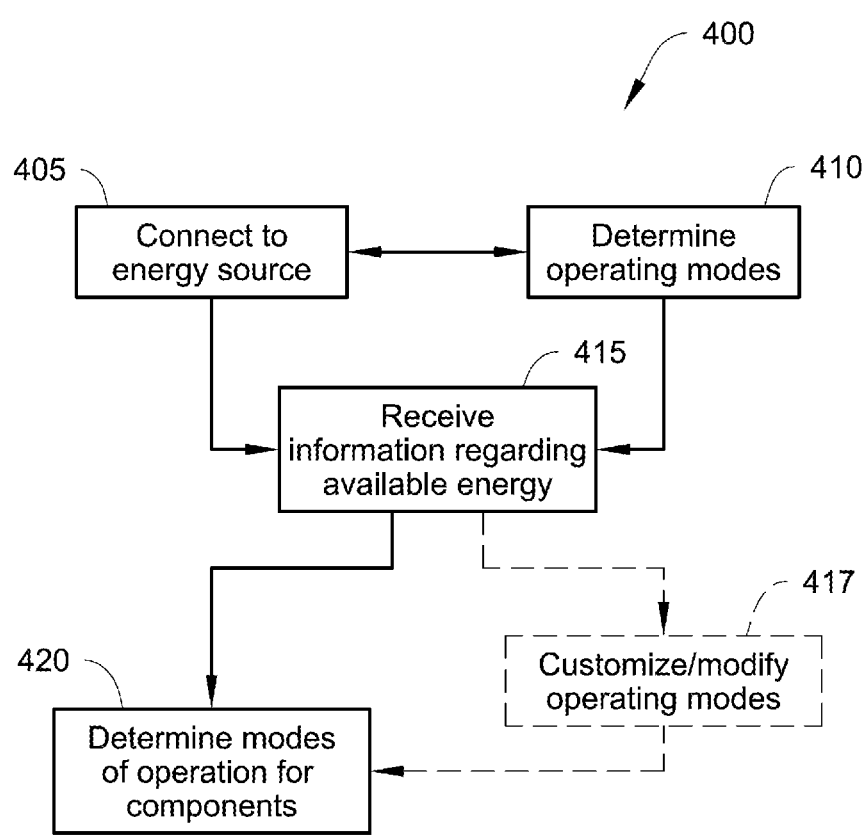

FIG. 4 illustrates an operational flowchart for managing an electrical power delivery environment, in accordance with at least on embodiment described herein.

DETAILED DESCRIPTION

The embodiments described herein are directed to the prioritized delivery of energy to primary and accessory electrical components associated with a vehicle that is at least partially electrically powered, as well as to a power source of the vehicle itself.

Embodiments of this disclosure can be applied generally to, for example, a climate-control system for a transport unit. More particularly, the example embodiments described and recited herein pertain to producing and/or customizing operational modes, for both components of the climate-control system as well as the transport unit, that trade-off performance for efficiency at various levels of energy available from an energy source.

Transport climate control systems, in accordance with the embodiments described and recited herein, have their operation modified based on energy available thereto. The modifications in operation may be implemented manually or automatically. Thus, the embodiments described and recited herein can prevent premature loss of function and mobility, when sharing an energy source with the transport unit, i.e., vehicle.

In the following detailed description, reference is made to the accompanying drawings, which are included as a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

While the embodiments described below illustrate different embodiments of a transport climate-control system, it will be appreciated that the electrically powered accessory is not limited to the transport climate-control system or a climate control unit (CCU) of the transport climate-control system. A CCU may be, e.g., a transport refrigeration unit (TRU). In other embodiments, the electrically powered accessory may be, for example, a crane attached to a vehicle, a cement mixer attached to a truck, one or more food appliances of a food truck, a boom arm attached to a vehicle, a concrete pumping truck, a refuse truck, a fire truck (with a power driven ladder, pumps, lights, etc.), etc. The electrically powered accessory may require continuous operation even when the vehicle's ignition is turned off and/or the vehicle is parked, idling, and/or charging. The electrically powered accessory may further require substantial power to operate, continuous operation, and/or autonomous operation (e.g., controlling temperature/humidity/airflow of a climate-controlled space) on an as needed basis, independent of the vehicle's operational mode.

Figure 1A:
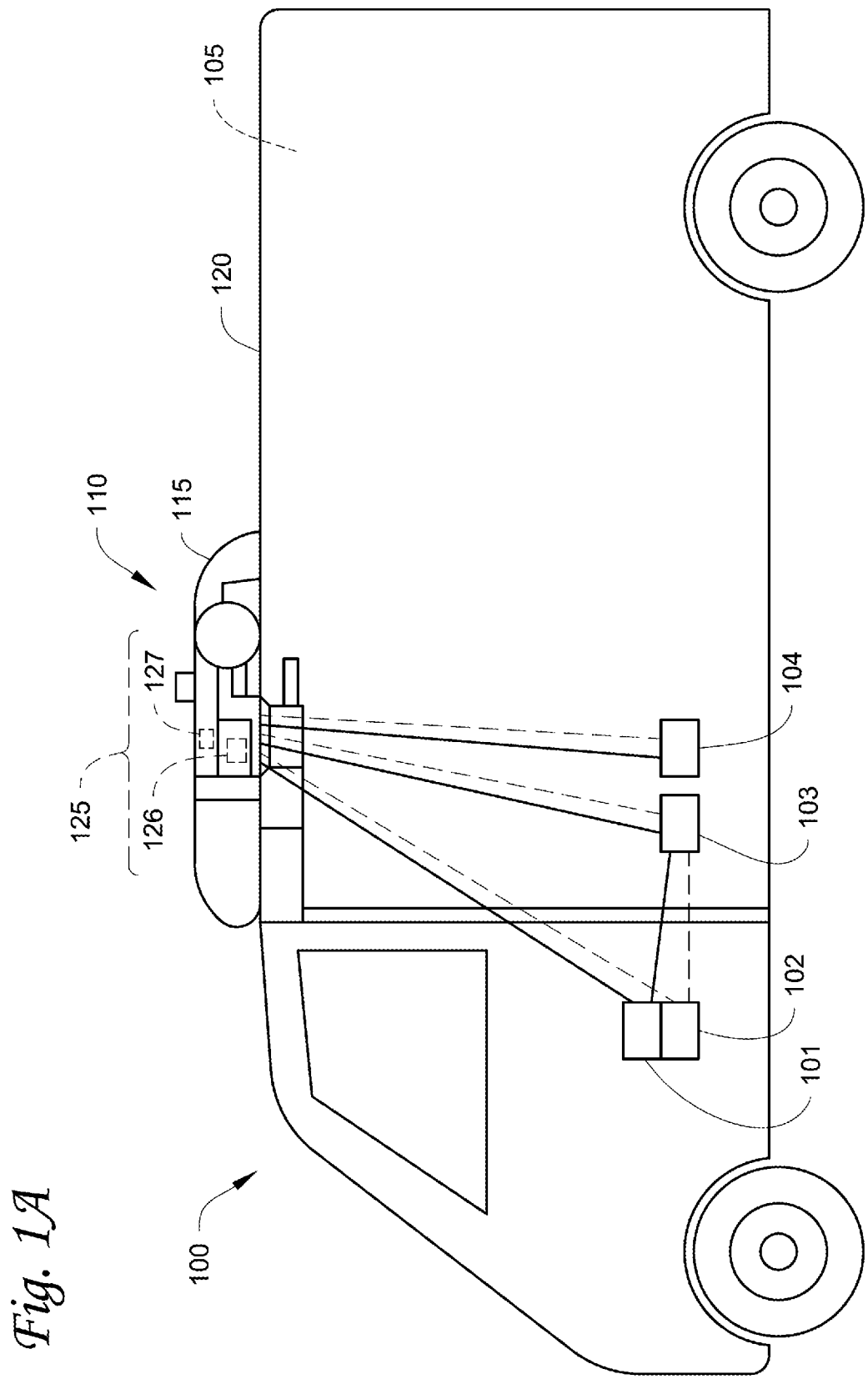
FIG. 1A illustrates a side view of a van with a transport climate-control system, according to at least one example embodiment described or recited herein.

FIG. 1A depicts a climate-controlled van 100 that includes a climate-controlled space 105 for carrying cargo and a transport climate-control system 110 for providing climate control within the climate-controlled space 105. The transport climate-control system 110 includes a CCU 115 that is mounted to a rooftop 120 of the van 100. The transport climate-control system 110 may include, among other components, a climate control circuit (not shown) that connects, for example, a compressor, a condenser, an evaporator and an expansion device to provide climate control within the climate-controlled space 105. It is noted that the embodiments described herein are not limited to climate-controlled vans, but may apply to any type of transport unit (e.g., a truck, a container (such as a container on a flat car, an intermodal container, a marine container, etc.), a box car, a semi-tractor, a bus, or other similar transport unit), etc.

The transport climate-control system 110 also includes a programmable climate controller 125 and one or more sensors (not shown) that are configured to measure one or more parameters of the transport climate-control system 110 (e.g., an ambient temperature outside of the van 100, an ambient humidity outside of the van 100, a compressor suction pressure, a compressor discharge pressure, a supply air temperature of air supplied by the CCU 115 into the climate-controlled space 105, a return air temperature of air returned from the climate-controlled space 105 back to the CCU 115, a humidity within the climate-controlled space 105, etc.) and communicate parameter data to the climate controller 125. The climate controller 125 is configured to, at least, control operation of the transport climate-control system 110 including the components of the climate control circuit. The climate controller unit 125 may comprise a single integrated control unit 126 or may comprise a distributed network of climate controller elements 126, 127. The number of distributed control elements in a given network may depend upon the particular application of the principles described herein.

Climate controller 125 may be configured, programmed, or otherwise designed to manage power inputs from at least one of, e.g., electrical supply equipment and utility power source, etc., and to prioritize and control power flow to a vehicle and one or more electrical accessories e.g., climate-control unit.

Climate controller 125 may be further configured, programmed, or otherwise designed to communicate information received from electrical supply equipment to the vehicle and from the vehicle to the electrical supply equipment.

Controller 125 may communicate with electrical supply equipment using e.g., powerline communications, Pulse Width Modulation (PWM) communications, Local Interconnect Network (LIN) communications, Controller Area Network (CAN) communications, Pilot signal analog feedback, etc., to support, e.g., CCS, ChadeMO, Guobiao recommended-standard 20234, Tesla Supercharger, and/or other electrical supply equipment standards.

Communications between controller 125 and electrical supply equipment may include, e.g., a Control Pilot (CP) line and a Plug Present (PP) line. The CP line may be used by, e.g., the controller to indicate, e.g., the power receiving level(s) of, e.g., the vehicle and/or electrically powered accessory, e.g., climate-control unit, to initiate receiving power and/or to communicate other information to electrical supply equipment.

As referenced herein, the CP may be used for basic signaling or high level communication (HLC). A basic signal utilizes a 1 kHz PWM signal sent by a charging station to the vehicle over the CP signal. HLC utilizes either power line modulation over the CP or a wireless connection (Wi-Fi or Zigbee) to set up a connection between the ESE and the vehicle using, e.g., digital communication protocol ISO 15118. Both basic signaling and HLC allow the ESE to provide data to controller 125 indicating ESE's maximum current output. Then, a VFD, soft-starter, DC-DC converters, LDO, or other power electronics corresponding to controller 125 may be utilized to ramp AC or DC current to various electrical loads on a transport climate control or HVAC units and control the ramp rate based on the CP signal. Thus, the aforementioned power electronics may be disposed between the energy supply, e.g., ESE, battery, etc., and the electrical load/accessory, e.g., motor, inverter, etc., and either internally calculate what a ramp rate should be or will receive that information from another controller that receives the control pilot signal.

The PP line, i.e., Plug Present line, may be utilized to determine a status of a plug in a socket.

The climate-controlled van 100 may also include a vehicle PDU (power distribution unit) 101, a VES (vehicle energy source) 102, a standard charging port 103, and/or an enhanced charging port 104 (see FIGS. 3A and 3B for the detailed description about the standard charging port and the enhanced charging port). The VES 102 may include a controller (not shown). The vehicle PDU 101 may include a controller (not shown). In one embodiment, the vehicle PDU controller may be a part of the VES controller or vice versa. In one embodiment, power may be distributed from e.g., an EVSE (not shown), via the standard charging port 103, to the vehicle PDU 101. Power may also be distributed from the vehicle PDU 101 to an electrical supply equipment (ESE, not shown) and/or to the CCU 115 (see solid lines for power lines and dotted lines for communication lines). In another embodiment, power may be distributed from e.g., an EVSE (not shown), via the enhanced charging port 104, to an ESE (not shown) and/or to the CCU 115. The ESE may then distribute power to the vehicle PDU 101 via the standard charging port 103. See FIGS. 2, 3A, and 3B for a more detailed discussion of the ESE.

Figure 1B:
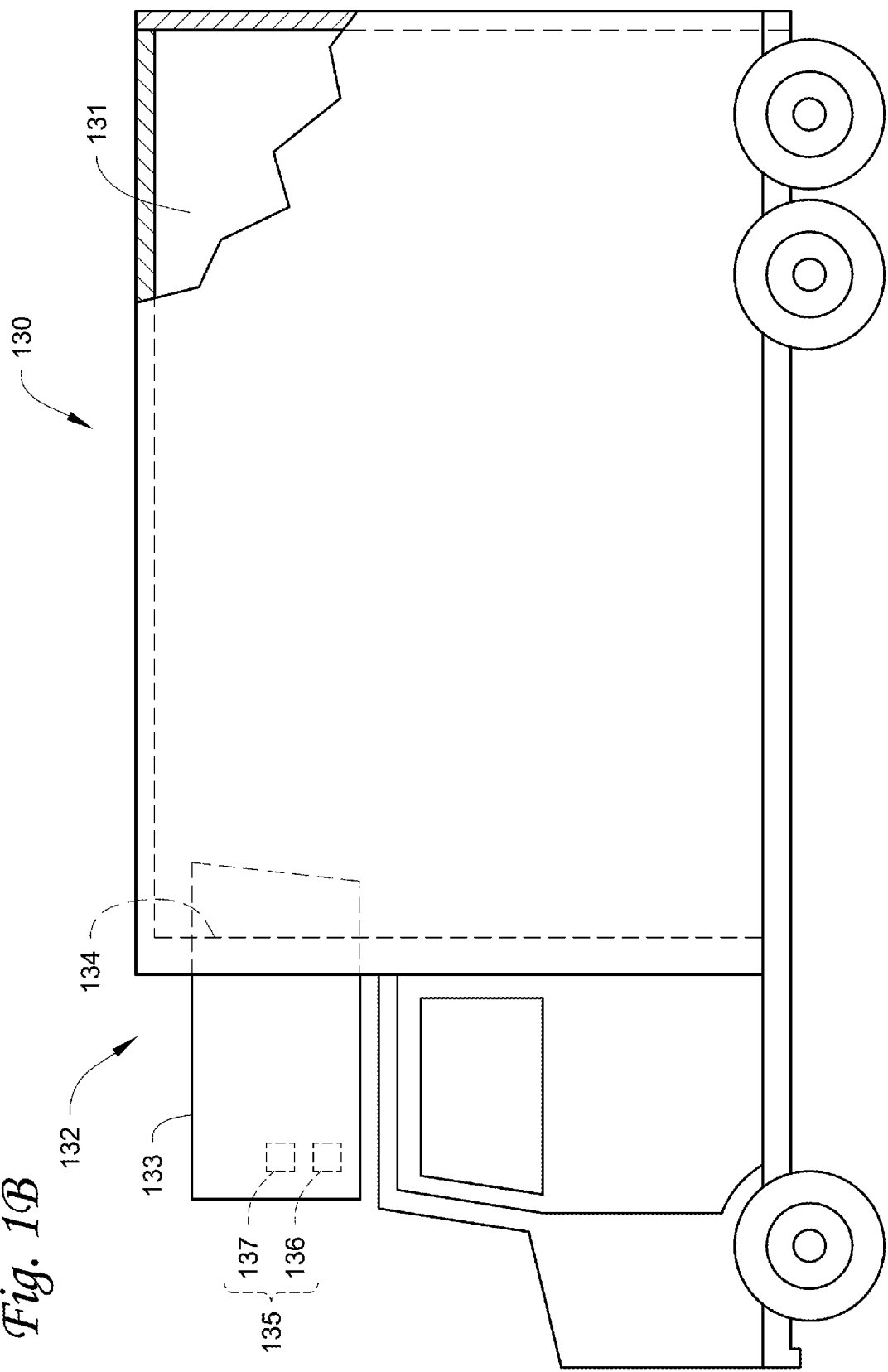
FIG. 1B illustrates a side view of a truck with a transport climate-control system, according to at least one example embodiment described or recited herein.

FIG. 1B depicts a climate-controlled straight truck 130 that includes a climate-controlled space 131 for carrying cargo and a transport climate-control system 132. The transport climate-control system 132 includes a CCU 133 that is mounted to a front wall 134 of the climate-controlled space 131. The CCU 133 may include, amongst other components, a climate control circuit (not shown) that connects, for example, a compressor, a condenser, an evaporator and an expansion device to provide climate control within the climate-controlled space 131.

The transport climate-control system 132 also includes a programmable climate controller 135 and one or more sensors (not shown) that are configured to measure one or more parameters of the transport climate-control system 132 (e.g., an ambient temperature outside of the truck 130, an ambient humidity outside of the truck 130, a compressor suction pressure, a compressor discharge pressure, a supply air temperature of air supplied by the CCU 133 into the climate-controlled space 131, a return air temperature of air returned from the climate-controlled space 131 back to the CCU 133, a humidity within the climate-controlled space 131, etc.) and communicate parameter data to the climate controller 135. The climate controller 135 is configured to, at least, control operation of the transport climate-control system 132 including components of the climate control circuit. The climate controller 135 may comprise a single integrated control unit 136 or may comprise a distributed network of climate controller elements 136, 137. The number of distributed control elements in a given network may depend upon the particular application of the principles described herein.

Climate controller 135 may be configured, programmed, or otherwise designed to manage power inputs from at least one of, e.g., electrical supply equipment and utility power source, etc., and to prioritize and control power flow to a vehicle and one or more electrical accessories e.g., climate-control unit.

Climate controller 135 may be further configured, programmed, or otherwise designed to communicate information received from electrical supply equipment to the vehicle and from the vehicle to the electrical supply equipment.

Controller 135 may communicate with electrical supply equipment using e.g., powerline communications, PWM communications, LIN communications, CAN communications, Pilot signal analog feedback, etc., to support, e.g., CCS, ChadeMO, Guobiao recommended-standard 20234, Tesla Supercharger, and/or other electrical supply equipment standards.

As referenced herein, the CP may be used for basic signaling or HLC. A basic signal utilizes a 1 kHz PWM signal sent by a charging station to the vehicle over the CP signal. HLC utilizes either power line modulation over the CP or a wireless connection (Wi-Fi or Zigbee) to set up a connection between the ESE and the vehicle using, e.g., digital communication protocol ISO 15118. Both basic signaling and HLC allow the ESE to provide data to controller 135 indicating ESE's maximum current output. Then, a VFD, soft-starter, DC-DC converters, LDO, or other power electronics corresponding to controller 135 may be utilized to ramp AC or DC current to various electrical loads on a transport climate control or HVAC units and control the ramp rate based on the CP signal. Thus, the aforementioned power electronics may be disposed between the energy supply, e.g., ESE, battery, etc., and the electrical load/accessory, e.g., motor, inverter, etc., and either internally calculate what a ramp rate should be or will receive that information from another controller that receives the control pilot signal.

The PP line, i.e., Plug Present line, may be utilized to determine a status of a plug in a socket.

Similar to the climate-controlled van 100 shown in FIG. 1A, the climate-controlled straight truck 130 of FIG. 1B may also include a vehicle PDU (such as the vehicle PDU 101 shown in FIG. 1A), a VES (such as the VES 102 shown in FIG. 1A), a standard charging port (such as the standard charging port 103 shown in FIG. 1A), and/or an enhanced charging port (e.g., the enhanced charging port 104 shown in FIG. 1A), communicating with and distribute power from/to the corresponding ESE and/or the CCU 133.

Figure 1C:
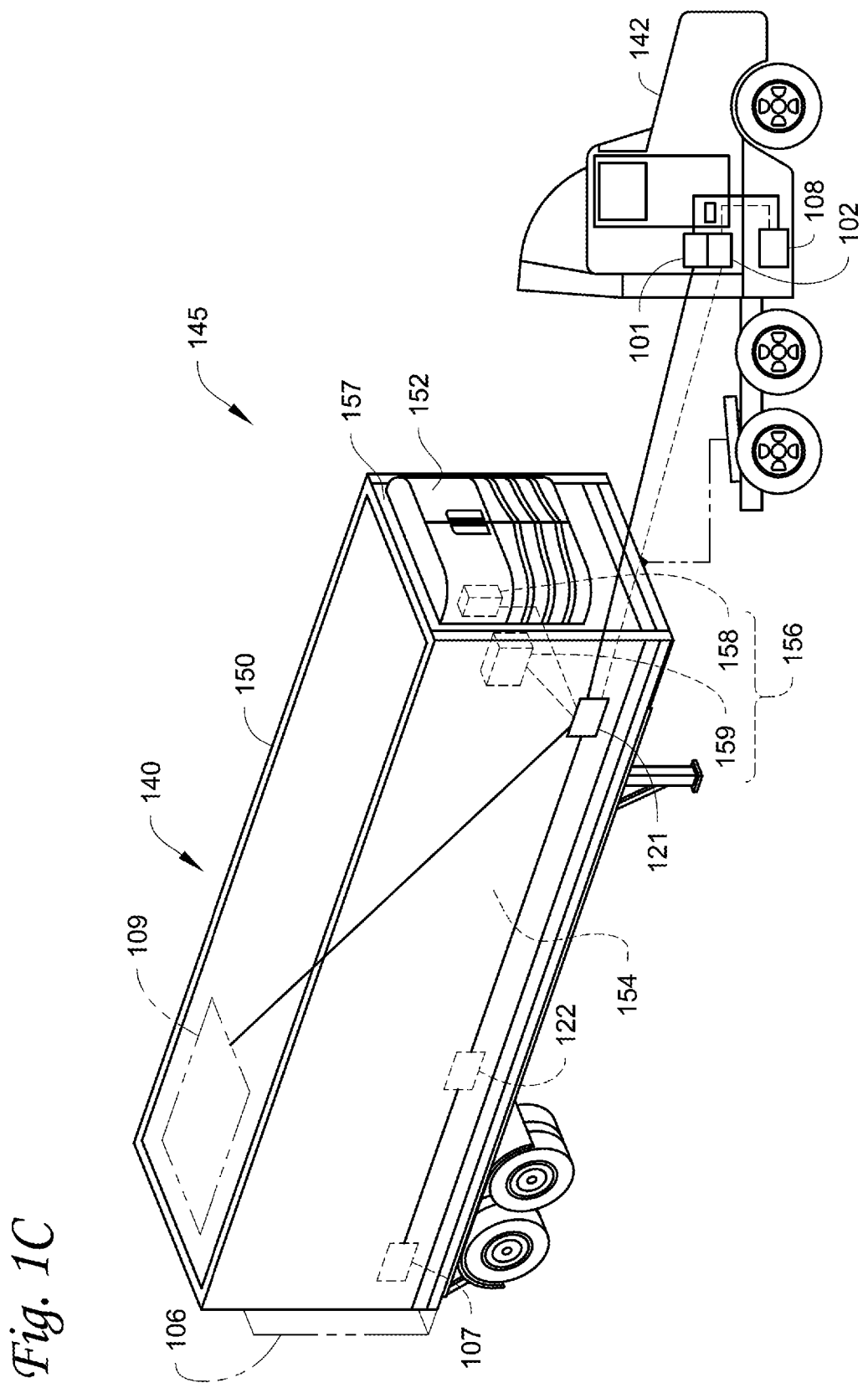
FIG. 1C illustrates a perspective view of a climate-controlled transport unit, with a transport climate-control system, attached to a tractor, according to at least one example embodiment described or recited herein.

FIG. 1C illustrates one embodiment of a climate-controlled transport unit 140 attached to a tractor 142. The climate-controlled transport unit 140 includes a transport climate-control system 145 for a transport unit 150. The tractor 142 is attached to and is configured to tow the transport unit 150. The transport unit 150 shown in FIG. 1C is a trailer.

The transport climate-control system 145 includes a CCU 152 that provides environmental control (e.g. temperature, humidity, air quality, etc.) within a climate-controlled space 154 of the transport unit 150. The CCU 152 is disposed on a front wall 157 of the transport unit 150. In other embodiments, it will be appreciated that the CCU 152 may be disposed, for example, on a rooftop or another wall of the transport unit 150. The CCU 152 includes a climate control circuit (not shown) that connects, for example, a compressor, a condenser, an evaporator and an expansion device to provide conditioned air within the climate-controlled space 154.

The transport climate-control system 145 also includes a programmable climate controller 156 and one or more sensors (not shown) that are configured to measure one or more parameters of the transport climate-control system 145 (e.g., an ambient temperature outside of the transport unit 150, an ambient humidity outside of the transport unit 150, a compressor suction pressure, a compressor discharge pressure, a supply air temperature of air supplied by the CCU 152 into the climate-controlled space 154, a return air temperature of air returned from the climate-controlled space 154 back to the CCU 152, a humidity within the climate-controlled space 154, etc.) and communicate parameter data to the climate controller 156. The climate controller 156 is configured to, at least, control operation of the transport climate-control system 145 including components of the climate control circuit. The climate controller 156 may comprise a single integrated control unit 158 or may comprise a distributed network of climate controller elements 158, 159. The number of distributed control elements in a given network may depend upon the particular application of the principles described herein.

Climate controller 156 may be configured, programmed, or otherwise designed to manage power inputs from at least one of, e.g., electrical supply equipment and utility power source, etc., and to prioritize and control power flow to a vehicle and one or more electrical accessories e.g., climate-control unit.

Climate controller 156 may be further configured, programmed, or otherwise designed to communicate information received from electrical supply equipment to the vehicle and from the vehicle to the electrical supply equipment.

Controller 156 may communicate with electrical supply equipment using e.g., powerline communications, PWM communications, LIN communications, CAN communications, Pilot signal analog feedback, etc., to support, e.g., CCS, ChadeMO, Guobiao recommended-standard 20234, Tesla Supercharger, and/or other electrical supply equipment standards.

As referenced herein, the CP may be used for basic signaling or HLC. A basic signal utilizes a 1 kHz PWM signal sent by a charging station to the vehicle over the CP signal. HLC utilizes either power line modulation over the CP or a wireless connection (Wi-Fi or Zigbee) to set up a connection between the ESE and the vehicle using, e.g., digital communication protocol ISO 15118. Both basic signaling and HLC allow the ESE to provide data to controller 156 indicating ESE's maximum current output. Then, a VFD, soft-starter, DC-DC converters, LDO, or other power electronics corresponding to controller 156 may be utilized to ramp AC or DC current to various electrical loads on a transport climate control or HVAC units and control the ramp rate based on the CP signal. Thus, the aforementioned power electronics may be disposed between the energy supply, e.g., ESE, battery, etc., and the electrical load/accessory, e.g., motor, inverter, etc., and either internally calculate what a ramp rate should be or will receive that information from another controller that receives the control pilot signal.

The PP line, i.e., Plug Present line, may be utilized to determine a status of a plug in a socket.

In some embodiments, the tractor 142 may include an optional APU 108. The optional APU 108 may be an electric auxiliary power unit (eAPU). Also, in some embodiments, the tractor 142 may also include a vehicle PDU 101 and a VES 102 (not shown). The APU 108 may provide power to the vehicle PDU 101 for distribution. It will be appreciated that for the connections, solid lines represent power lines and dotted lines represent communication lines. The climate-controlled transport unit 140 may include a PDU 121 connecting to power sources (including, for example, an optional solar power source 109; an optional power source 122 such as Genset, fuel cell, undermount power unit, auxiliary battery pack, etc.; and/or an optional lift gate battery 107, etc.) of the climate-controlled transport unit 140. The PDU 121 may include a PDU controller (not shown). The PDU controller may be a part of the climate controller 156. The PDU 121 may distribute power from the power sources of the climate-controlled transport unit 140 to e.g., the transport climate-control system 145. The climate-controlled transport unit 140 may also include an optional lift gate 106. The optional lift gate battery 107 may provide power to open and/or close the lift gate 106.

Similar to the climate-controlled van 100, the climate-controlled transport unit 140 attached to the tractor 142 of FIG. 1C may also include a VES (such as the VES 102 shown in FIG. 1A), a standard charging port (such as the standard charging port 103 shown in FIG. 1A), and/or an enhanced charging port (such as the enhanced charging port 104 shown in FIG. 1A), communicating with and distribute power from/to a corresponding ESE and/or the CCU 152.

Figure 1D:
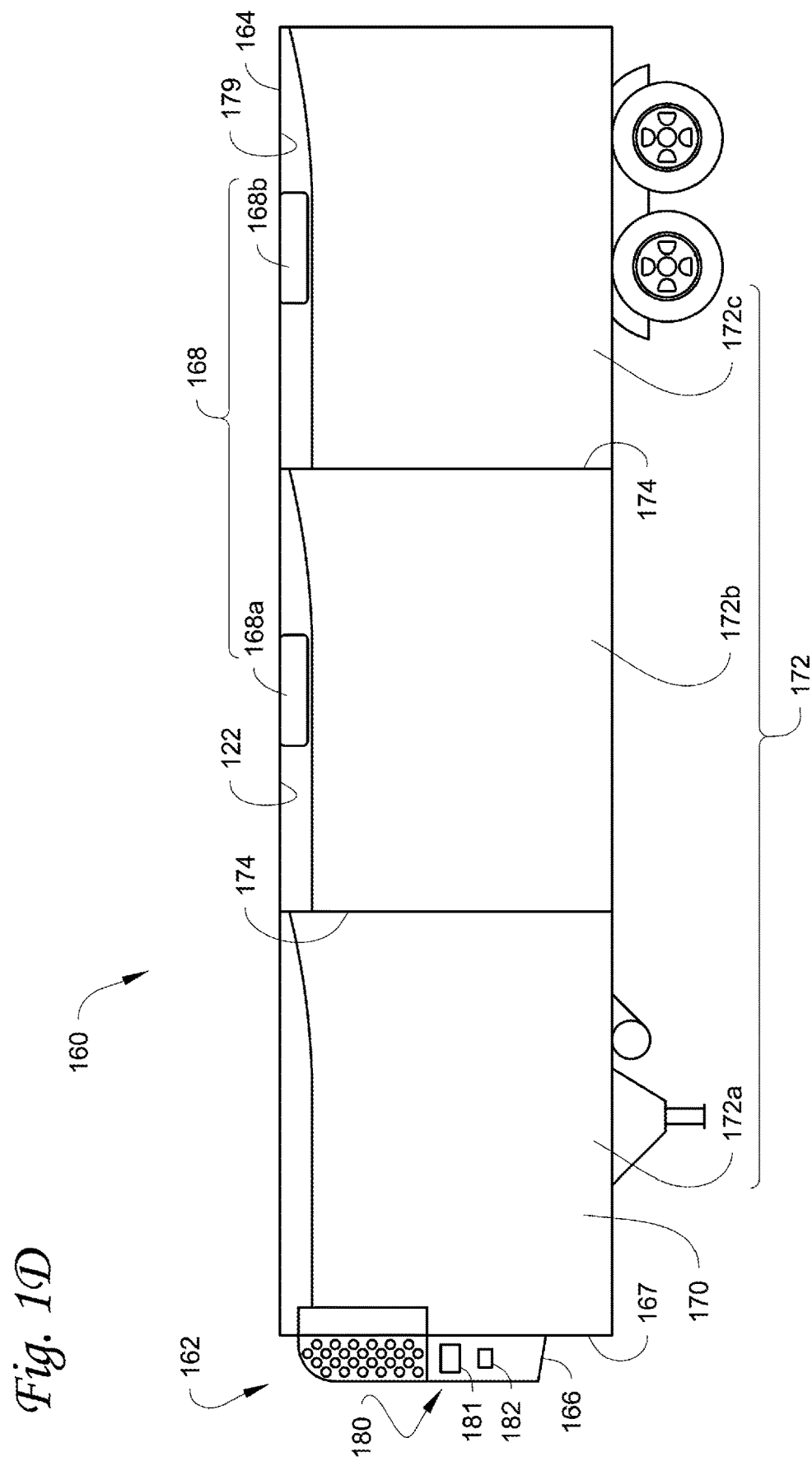
FIG. 1D illustrates a side view of a climate-controlled transport unit with a multi-zone transport climate-control system, according to at least one example embodiment described or recited herein.

FIG. 1D illustrates another embodiment of a climate-controlled transport unit 160. The climate-controlled transport unit 160 includes a multi-zone transport climate-control system (MTCS) 162 for a transport unit 164 that may be towed, for example, by a tractor (not shown). It will be appreciated that the embodiments described herein are not limited to tractor and trailer units, but may apply to any type of transport unit (e.g., a truck, a container (such as a container on a flat car, an intermodal container, a marine container, etc.), a box car, a semi-tractor, a bus, or other similar transport unit), etc.

The MTCS 162 includes a CCU 166 and a plurality of remote units 168 that provide environmental control (e.g. temperature, humidity, air quality, etc.) within a climate-controlled space 170 of the transport unit 164. The climate-controlled space 170 may be divided into a plurality of zones 172. The term "zone" means a part of an area of the climate-controlled space 170 separated by walls 174. The CCU 166 may operate as a host unit and provide climate control within a first zone 172a of the climate-controlled space 166. The remote unit 168a may provide climate control within a second zone 172b of the climate-controlled space 170. The remote unit 168b may provide climate control within a third zone 172c of the climate-controlled space 170. Accordingly, the MTCS 162 may be used to separately and independently control environmental condition(s) within each of the multiple zones 172 of the climate-controlled space 162.

The CCU 166 is disposed on a front wall 167 of the transport unit 160. In other embodiments, it will be appreciated that the CCU 166 may be disposed, for example, on a rooftop or another wall of the transport unit 160. The CCU 166 includes a climate control circuit (not shown) that connects, for example, a compressor, a condenser, an evaporator and an expansion device to provide conditioned air within the climate-controlled space 170. The remote unit 168a is disposed on a ceiling 179 within the second zone 172b and the remote unit 168b is disposed on the ceiling 179 within the third zone 172c. Each of the remote units 168a,b includes an evaporator (not shown) that connects to the rest of the climate control circuit provided in the CCU 166.

The MTCS 162 also includes a programmable climate controller 180 and one or more sensors (not shown) that are configured to measure one or more parameters of the MTCS 162 (e.g., an ambient temperature outside of the transport unit 164, an ambient humidity outside of the transport unit 164, a compressor suction pressure, a compressor discharge pressure, supply air temperatures of air supplied by the CCU 166 and the remote units 168 into each of the zones 172, return air temperatures of air returned from each of the zones 172 back to the respective CCU 166 or remote unit 168a or 168b, a humidity within each of the zones 118, etc.) and communicate parameter data to a climate controller 180. The climate controller 180 is configured to, at least, control operation of the MTCS 162 including components of the climate control circuit. The climate controller 180 may comprise a single integrated control unit 181 or may comprise a distributed network of climate controller elements 181, 182. The number of distributed control elements in a given network may depend upon the particular application of the principles described herein.

Climate controller 180 may be configured, programmed, or otherwise designed to manage power inputs from at least one of, e.g., electrical supply equipment and utility power source, etc., and to prioritize and control power flow to a vehicle and one or more electrical accessories e.g., climate-control unit.

Climate controller 180 may be further configured, programmed, or otherwise designed to communicate information received from electrical supply equipment to the vehicle and from the vehicle to the electrical supply equipment.

Controller 180 may communicate with electrical supply equipment using e.g., powerline communications, PWM communications, LIN communications, CAN communications, Pilot signal analog feedback, etc., to support, e.g., CCS, ChadeMO, Guobiao recommended-standard 20234, Tesla Supercharger, and/or other electrical supply equipment standards.

As referenced herein, the CP may be used for basic signaling or HLC. A basic signal utilizes a 1 kHz PWM signal sent by a charging station to the vehicle over the CP signal. HLC utilizes either power line modulation over the CP or a wireless connection (Wi-Fi or Zigbee) to set up a connection between the ESE and the vehicle using, e.g., digital communication protocol ISO 15118. Both basic signaling and HLC allow the ESE to provide data to controller 180 indicating ESE's maximum current output. Then, a VFD, soft-starter, DC-DC converters, LDO, or other power electronics corresponding to controller 180 may be utilized to ramp AC or DC current to various electrical loads on a transport climate control or HVAC units and control the ramp rate based on the CP signal. Thus, the aforementioned power electronics may be disposed between the energy supply, e.g., ESE, battery, etc., and the electrical load/accessory, e.g., motor, inverter, etc., and either internally calculate what a ramp rate should be or will receive that information from another controller that receives the control pilot signal.

The PP line, i.e., Plug Present line, may be utilized to determine a status of a plug in a socket.

Similar to the climate-controlled van 100, the climate-controlled transport unit 160 of FIG. 1D may also include a vehicle PDU (such as the vehicle PDU 101 shown in FIG. 1A), a VES (such as the VES 102 shown in FIG. 1A), a standard charging port (such as the standard charging port 103 shown in FIG. 1A), and/or an enhanced charging port (e.g., the enhanced charging port 104 shown in FIG. 1A), communicating with and distribute power from/to the corresponding ESE and/or the CCU 166.

Figure 1E:
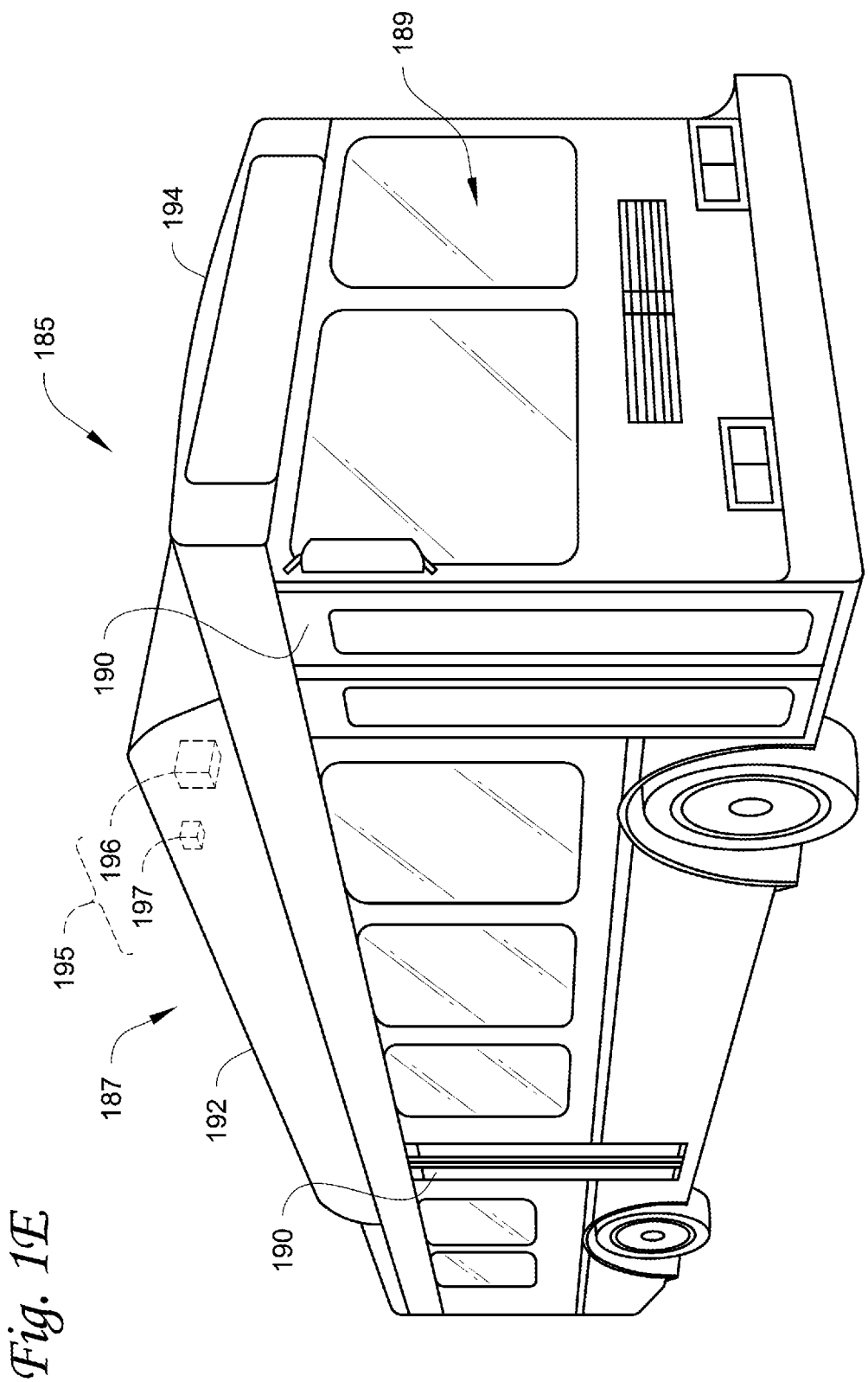
FIG. 1E illustrates a perspective view of a passenger vehicle including a transport climate-control system, according to at least one example embodiment described or recited herein.

FIG. 1E is a perspective view of a vehicle 185 including a transport climate-control system 187, according to one embodiment. The vehicle 185 is a mass-transit bus that may carry passenger(s) (not shown) to one or more destinations. In other embodiments, the vehicle 185 may be a school bus, railway vehicle, subway car, or other commercial vehicle that carries passengers. The vehicle 185 includes a climate-controlled space (e.g., passenger compartment) 189 supported that may accommodate a plurality of passengers. The vehicle 185 includes doors 190 that are positioned on a side of the vehicle 185. In the embodiment shown in FIG. 1E, a first door 190 is located adjacent to a forward end of the vehicle 185, and a second door 190 is positioned towards a rearward end of the vehicle 185. Each door 190 is movable between an open position and a closed position to selectively allow access to the climate-controlled space 189. The transport climate-control system 187 includes a CCU 192 attached to a roof 194 of the vehicle 185.

The CCU 192 includes a climate control circuit (not shown) that connects, for example, a compressor, a condenser, an evaporator and an expansion device to provide conditioned air within the climate-controlled space 189. The transport climate-control system 187 also includes a programmable climate controller 195 and one or more sensors (not shown) that are configured to measure one or more parameters of the transport climate-control system 187 (e.g., an ambient temperature outside of the vehicle 185, a space temperature within the climate-controlled space 189, an ambient humidity outside of the vehicle 185, a space humidity within the climate-controlled space 189, etc.) and communicate parameter data to the climate controller 195. The climate controller 195 is configured to, at least, control operation of the transport climate-control system 187 including components of the climate control circuit. The climate controller 195 may comprise a single integrated control unit 196 or may comprise a distributed network of climate controller elements 196, 197. The number of distributed control elements in a given network may depend upon the particular application of the principles described herein.

Climate controller 195 may be configured, programmed, or otherwise designed to manage power inputs from at least one of, e.g., electrical supply equipment and utility power source, etc., and to prioritize and control power flow to a vehicle and one or more electrical accessories e.g., climate-control unit.

Climate controller 195 may be further configured, programmed, or otherwise designed to communicate information received from electrical supply equipment to the vehicle and from the vehicle to the electrical supply equipment.

Controller 195 may communicate with electrical supply equipment using e.g., powerline communications, PWM communications, LIN communications, CAN communications, Pilot signal analog feedback, etc., to support, e.g., CCS, ChadeMO, Guobiao recommended-standard 20234, Tesla Supercharger, and/or other electrical supply equipment standards.

As referenced herein, the CP may be used for basic signaling or high level communication (HLC). A basic signal utilizes a 1 kHz PWM signal sent by a charging station to the vehicle over the CP signal. HLC utilizes either power line modulation over the CP or a wireless connection (Wi-Fi or Zigbee) to set up a connection between the ESE and the vehicle using, e.g., digital communication protocol ISO 15118. Both basic signaling and HLC allow the ESE to provide data to controller 195 indicating ESE's maximum current output. Then, a VFD, soft-starter, DC-DC converters, LDO, or other power electronics corresponding to controller 195 may be utilized to ramp AC or DC current to various electrical loads on a transport climate control or HVAC units and control the ramp rate based on the CP signal. Thus, the aforementioned power electronics may be disposed between the energy supply, e.g., ESE, battery, etc., and the electrical load/accessory, e.g., motor, inverter, etc., and either internally calculate what a ramp rate should be or will receive that information from another controller that receives the control pilot signal.

The PP line, i.e., Plug Present line, may be utilized to determine a status of a plug in a socket.

Similar to the climate-controlled van 100, the vehicle 185 including a transport climate-control system 187 of FIG. 1E may also include a vehicle PDU (such as the vehicle PDU 101 shown in FIG. 1A), a VES (such as the VES 102 shown in FIG. 1A), a standard charging port (such as the standard charging port 103 shown in FIG. 1A), and/or an enhanced charging port (e.g., the enhanced charging port 104 shown in FIG. 1A), communicating with and distribute power from/to the corresponding ESE and/or the CCU 192.

In some embodiments, a CCU (e.g., the CCU 115, 133, 152, 166, 192) may be an electrically powered climate control unit. Also, in some embodiments, the CCU may include a rechargeable energy storage device (not shown) that may provide power to a transport climate-control system (e.g., the transport climate-control systems 110, 132, 145, 162, 187). In some embodiments, the rechargeable energy storage device may be charged by AC power (e.g., three-phase AC power, single phase AC power, etc.). In some embodiments, the rechargeable energy storage device may be charged by DC power. In some embodiments, components of the transport climate-control system 110 (e.g., a compressor, one or more fans, one or more sensors, a controller, etc.) may require either AC power or DC power to operate. The CCU may include a receptacle (see FIG. 4) with an AC contact, a DC contact, and a communication contact for receiving a single plug at a first end of an optimized power cord. The second end of the optimized power cord have an AC plug that is connected to an AC power source and a DC plug that is connected to a DC power source that is separate from the AC power source. For example, in one embodiment, the AC power source may be a utility power source and the DC power source may be an electric vehicle charging station. In some embodiments, the AC plug at the second end of the optimized power cord may have a three-phase contact. In some embodiments, the AC plug at the second end of the optimized power cord may have a single-phase contact.

Related U.S. application Ser. No. 16/565,282, "OPTIMIZED POWER CORD FOR TRANSFERRING POWER TO A TRANSPORT CLIMATE-CONTROL SYSTEM," filed on Sep. 9, 2019, of which the description and drawings are incorporated herein by reference, may be referenced to supplement the description herein.

FIG. 2 schematically illustrates a power management system for a transport climate-control system, in accordance with at least one embodiment described herein. As depicted, power management system 200 may include, at least, an enhanced power distribution unit (ePDU) 210, which includes controller 215. The ePDU 210 may be electrically and/or communicatively connected to electrical supply equipment 220, to vehicle 230, and/or to electrically powered accessory 240 associated with transport climate-controlled system 241. The structure and functionality of ePDU 210 is described in more detail in U.S. application Ser. No. 16/565,205, "Transport Climate-controlled system with an Enhanced Power Distribution Unit for Managing Electrical Accessory Loads," filed Sep. 9, 2019.

Vehicle 230 may include at least on-board charger 231 and rechargeable energy storage system (RESS) 232. Vehicle 230 may be, as non-limiting examples, climate-controlled van 100, climate-controlled straight truck 130, tractor 142 with a climate-controlled transport unit 140, and/or vehicle 185, depicted in and described above with regard to FIGS. 1A-1E.

Electrically powered accessory 240 may include electrically powered accessory RESS 241; and electrically powered accessory 240 may correspond to, as non-limiting examples, the climate control units (CCUs) 115, 133, 152, 166, and/or 192 depicted in and described above with regard to FIGS. 1A-1E. Electrically powered accessory 240 is not limited to a CCU of a transport climate-controlled system. In other embodiments, the electrically powered accessory may be, for example, a crane attached to a vehicle, a cement mixer attached to a truck, one or more food appliances of a food truck, etc.

In accordance with at least one embodiment, the power management system 200 may further include user interface device 290, which may be implemented as a cell phone, a smart watch, a personal headset device, an application specific device, or a hybrid device that includes any of the above functions. Interface device 290 may also be implemented as a personal computer including both laptop computer and non-laptop computer configurations, including a server. The user interface device 290 may connect to and/or communicate with the electrical supply equipment 220 and the ePDU 210 either wirelessly, e.g., WiFi; via short-range communications protocol, e.g., Bluetooth or RF protocol; or via a wired connection, e.g., Internet, WAN, LAN, etc.

Electrical supply equipment 220 may be configured, programmed, or otherwise designed to supply electric power to one or more of vehicle 230 and electrically powered accessory 240, via connectors associated with ePDU 210.

The electric power supplied from the electrical supply equipment 220, via any one or more of energy power lines 207, 217, and 227 may be alternating current (AC) and/or direct current (DC) power. The supplied AC power may be either single-phase AC or three-phase AC power. The supplied DC power may be Low Voltage (LV) DC power (e.g., Class A) and/or High Voltage (HV) DC power (e.g., Class B).

As referenced herein, "low voltage" may refer to Class A of the ISO 6469-3 in the automotive environment, particularly a maximum working voltage of between 0V and 60V DC or between 0V and 30V AC.

As referenced herein, "high voltage" may refer to Class B of the ISO 6469-3 in the automotive environment, particularly a maximum working voltage of between 60V and 1500V DC or between 30V and 1000V AC.

The connectors may be any suitable connector that supports, e.g., Combined Charging System (CCS), ChadeMO, Guobiao recommended-standard 20234, Tesla Supercharger, and/or other electrical supply equipment standards.

Controller 215 may communicate with electrical supply equipment 220 using e.g., powerline communications, Pulse Width Modulation (PWM) communications, Local Interconnect Network (LIN) communications, Controller Area Network (CAN) communications, Pilot signal analog feedback, etc., to support, e.g., CCS, ChadeMO, Guobiao recommended-standard 20234, Tesla Supercharger, and/or other electrical supply equipment standards.

Communications between controller 215 and electrical supply equipment 220 may include, e.g., a Control Pilot (CP) line and a Plug Present (PP) line. The CP line may be used by, e.g., controller 215 to indicate, e.g., the power receiving level(s) of, e.g., vehicle 230 and/or electrically powered accessory 240, e.g., climate-control unit, to initiate receiving power and/or to communicate other information to electrical supply equipment 220. The PP line, i.e., Plug Present line, may further be utilized to determine a status of a plug in a socket.

Electrical supply equipment 220 may be configured, programmed, or otherwise designed to use the CP line to detect, e.g., the presence of vehicle 230 and/or electrically powered accessory 240, via ePDU 210, to communicate, e.g., the maximum and/or minimum allowable charging current and/or voltage to controller 215, and/or to control, e.g., the charging current and/or voltage, and/or the beginning and/or ending of power delivery. The PP line may prevent movement of vehicle 230 and/or electrically powered accessory 240 and to indicate, e.g., the latch release button to vehicle 230 and/or electrically powered accessory 240, via ePDU 210.

In addition, or alternatively, communications from electrical supply equipment 220 to ePDU 210 may be sent to user interface device 290. Thus, a user may review the information from electrical supply equipment 220 and send at least one request and/or at least one confirmation to electrical supply equipment 220 and/or controller 215, to make at least one adjustment and/or at least one request accordingly, via user interface device 290. In accordance with at least some embodiments, a user may authorize supplying power to one or both of the electrical energy storage system associated with vehicle 230 and the transport climate-control system, which may or may not have an energy storage device associated therewith to receive the delivered energy.

Controller 215 may be configured, programmed, or otherwise designed to communicate with a controller, e.g., controller 125, 135, 156, 180, and/or 195 of FIGS. 1A-1E, of electrically powered accessory 240, e.g., climate-control unit. If electrically powered accessory 240 indicates that electric energy is needed to power, e.g., electrically powered accessory RESS 241, electrically powered accessory 240, controller 215 may control ePDU 210 to distribute AC and/or DC power received from electrical supply equipment 220 to electrically powered accessory 240.

Controller 215 may be further configured, programmed, or otherwise designed to communicate with controller 233 of vehicle 230. In at least one embodiment, vehicle 230 may include sensors that provide data regarding, e.g., temperature, pressure, voltage, current, battery status, and/or battery power level sensor, etc., of at least on-board charger 231 and rechargeable energy storage system (RESS) 232. Controller 233 may communicate the status, e.g., status of the sensors and/or charge status, to controller 215. In at least one other embodiment, sensors associated with controller 215 may be provided to detect and facilitate reporting of, e.g., temperature, pressure, voltage, current, battery status, and/or battery charging level sensor, etc. Controller 215 may communicate, e.g., status of the sensors and/or charge status, to controller 233.

Controller 215 may be configured, programmed, or otherwise designed to communicate the information received from electrical supply equipment 220 to vehicle 230. Vehicle 230 may initiate/request power delivery from electrical supply equipment 220, via controller 215 and the CP line.

Controller 215 may be configured, programmed, or otherwise designed to manage power inputs from at least onboard charger 231 and RESS 232, and produce and/or facilitate customized operational modes, for both components of electrically powered accessory 240 and vehicle 230, that trade-off performance for efficiency at various levels of energy available from an energy source. In accordance with at least some example embodiments, based on user priorities, as available energy levels decrease, the operation mode and performance of the vehicle, climate control unit and, or any electrically powered accessory may be automatically adjusted to prolong unconstrained operation of the overall system.

If vehicle 230 indicates that electric energy is needed to charge the vehicle 230, controller 215 may control ePDU 210 to distribute AC and/or DC power received from electrical supply equipment 220 to vehicle 230 to provide power to the on-board charger 231 and/or to charge the RESS 232.

As set forth above, controller 215 may be further configured, programmed, or otherwise designed to communicate with a controller of electrically powered accessory 240, e.g., climate-control unit. In at least one embodiment, accessory 240 may include sensors, e.g., temperature, pressure, voltage, current, battery status, and/or battery charging level of, at least, RESS 241. Electrically powered accessory 240 may communicate the status, e.g., status of the sensors and/or charge status to controller 215. As set forth above, in at least one embodiment, sensors associated with controller 215 may be provided to detect and facilitate reporting of, e.g., temperature, pressure, voltage, current, battery status, and/or battery charging level sensor, etc. Controller 215 may communicate, e.g., status of the sensors and/or charge status, to electrically powered accessory 240.

Controller 215 may be configured, programmed, or otherwise designed to communicate the information received from electrical supply equipment 220 to accessory 240. Accessory 240 may initiate/request power delivery from electrical supply equipment 220, via controller 215 and a communication portal.

If electrically powered accessory 240 indicates that electric power is needed for electrically powered accessory 240, controller 215 may control ePDU 210 to distribute AC and/or DC power received from electrical supply equipment 220 to accessory 240 to provide energy to at least RESS 241.

Similarly, if vehicle 230 indicates that electric power is needed for onboard charger 231, controller 215 may control ePDU 210 to distribute AC and/or DC power received from electrical supply equipment 220 to vehicle 230 to provide energy to at least RESS 2322.

Controller 215 may be configured, programmed, or otherwise designed to manage power inputs from at least onboard charger 231 and RESS 232, and produce and/or facilitate customized operational modes, for both components of electrically powered accessory 240 and vehicle 230, that trade-off performance for efficiency at various levels of energy available from an energy source.

Non-limiting examples of such modes, which may respectively prioritize energy distribution to either of vehicle 230 or electrically powered accessory 240, depending on various conditions, may be a default mode schedule, a conservative energy saver mode for one of the vehicle 230 or electrically powered accessory 240, and an aggressive performance mode.

That is, based on the energy remaining in, and therefore capable of distribution from, onboard charger 231 during operation of vehicle 230 and electrically powered accessory 240, the various operation modes are intended to trade-off performance for efficiency at various levels of available energy available. As set forth above, based on user priorities, as available energy levels decrease, the operation mode and performance of the vehicle, climate control unit and, or any electrically powered accessory may be automatically adjusted to prolong unconstrained operation of the overall system. If less than a user-defined relative threshold of energy available remains, e.g., 20%, and accessory performance is prioritized, peak acceleration or speed of the vehicle may be limited in an effort to conserve energy. If vehicle performance is prioritized, settings within the controller will be automatically adjusted such that the performance, e.g., temperature control accuracy, airflow rate or time to temperature set-point of a CCU may be adjusted to conserve energy for the vehicle.

In accordance with at least some embodiments, a user may define minimally viable conditions for operating the accessory or the vehicle, and assign a ranked priority to the vehicle and accessory in case both minimally viable conditions were not able to be met simultaneously.

Priority may change dynamically. For example, while the vehicle is in transit, the vehicle may take priority; however, once stationary, the accessory may take priority. Thresholds may also be based on estimated unconstrained runtime remaining. Users may define a threshold, e.g., one hour of unconstrained runtime remaining, when the accessory may transition into its highest efficiency mode in order to prolong the possible cargo protection time, although such threshold may be predetermined based on prior usage, prior settings, etc.

Non-limiting factors to consider for each of the various modes of operation may include, for vehicle 230, distance to a next connection to ESE 220; and, for electrically powered accessory 240, climate control needs to maintain cargo integrity when accessory 240 is a CCU.

It will be appreciated that power demand/request from electrically powered accessory 240, e.g., for powering the transport climate-controlled system to keep the cargo, e.g., produce, frozen foods, pharmaceuticals, etc., safe and/or fresh may have higher priority than power demand/request from vehicle 230, e.g., for delivering power to a battery associated with vehicle 230. As such, controller 215 may control ePDU 210 to prioritize distribution of AC and/or DC power received from electrical supply equipment 220 to electrically powered accessory 240 first, and then to vehicle 230 if the higher priority power demand from the electrically powered accessory 240 is satisfied. That is, electrical power source priorities may include prioritizing load integrity attributable to accessory 240 over delivering power to vehicle 230; although, in accordance with other example embodiments, the opposite prioritization is valid, as well.

FIG. 3 illustrates a block diagram representing components of controller 215 corresponding to an energy management system, in accordance with at least one embodiment described herein. As depicted, controller 215 may include, at least, source meter 305, cache 310, mode control unit 315, and activation unit 320. As set forth above, the description of each successive drawing may reference features from one or more of the previous drawings to provide clearer context and a more substantive explanation of the current example embodiment. Still, the example embodiments described in the detailed description, drawings, and claims are not intended to be limiting. Further, although illustrated as discrete boxes or components, any one or more of boxes 305, 310, 315, and 320 may be divided into additional boxes or components, combined into fewer boxes or components, or eliminated altogether while being contemplated within the scope of the disclosed subject matter. It will be understood by those skilled in the art that each function and/or operation of the boxes or components may be implemented, individually and/or collectively, by a wide range of hardware, software, firmware, or any combination thereof.

Source meter 305 may refer to a component that is configured, programmed, or otherwise designed to determine energy available from the energy source, via a communicative connection. That is, source meter 305 may detect an incoming electrical connection from, at least onboard charger 231, via sensors corresponding to vehicle 230. Thus, source meter 305 may receive information indicating energy available from an energy source. Controller 215, via source meter 305, may communicate with onboard charger 231 in order to, at least, determine the amount of energy available therefrom.

Cache 310 may refer to a component that is configured, programmed, or otherwise designed to receive and store energy requirements for a battery of vehicle 230 and for electrically powered accessory 240 under various conditions that pertain to energy availability as determined by source meter 305. The energy requirements for vehicle 230 may include energy needed to reach full energy or at least sustainable energy for completion of a task, of electrical components associated with vehicle 230 including, but not limited to, RESS 232, i.e., battery. The energy requirements for electrically powered system 240 may include energy needed to reach full energy or at least sustainable energy for maintaining tasks of, e.g., a climate control unit, for various tasks.

Mode control unit 315 may refer to a component that is configured, programmed, or otherwise designed to determine modes of operation for the electrical system, which may include electrically powered accessory 240, and components thereof, and a battery of vehicle 230, under various conditions pertaining to energy availability. The modes of operation may include prioritizing allocation of energy to RESS 232 of vehicle 230 over allocation of energy to accessory RESS 241 of accessory 240 under some conditions pertaining to energy availability; and, conversely, the modes of operation may include prioritizing allocation of energy to electrically powered accessory 240 over allocation of energy to the battery of vehicle 230.

A high performance mode may have no thresholds, in which the accessory may operate at its peak performance until the energy source is depleted. A high efficiency mode may have multiple thresholds, where performance is slightly reduced as available energy passes each threshold. A balanced mode may have high performance while energy is plentiful (>66%), then reduce performance when a moderate amount of energy is available (33%-66%), then disable the system below 33% to channel all energy to the vehicle. A balanced mode may be useful when the energy demands of the vehicle are uncertain and the accessory must adapt to unpredictable conditions.

As referenced above, the prioritization of allocation of energy may include favorably allocating distribution of energy to either of the battery of vehicle 230 or electrically powered system 240 over the other, based on energy needs thereof as well as energy available from ESE 220. Such favorable allocation may include distributing energy first to the battery of vehicle 230 in the amount needed to reach full energy or at least sustainable energy for completion of a task, of electrical components associated with vehicle 230 including, but not limited to, rechargeable energy storage system 232, i.e., battery, before distributing energy to electrically powered accessory 240. Conversely, such favorable allocation may include distributing energy first to electrically powered accessory 240 to reach full energy or at least sustainable energy for maintaining tasks of, e.g. a climate control unit.

The modes of operation for both the battery of vehicle 230 and electrically powered accessory 240 may vary based as energy available from ESE 220 changes. Thus, a change from one mode to another may be automated, as energy available from onboard charger 231 changes.

Activation unit 320 may refer to a component that is configured, programmed, or otherwise designed to activate of one of the modes of operation for the electrical system. That is, activation unit 320 may automatically change modes of operation or prompt a user to manually change modes of operation based on a level of energy available from onboard charger 231, as detected by source meter 305, relative to energy requirements as received and stored by cache 310, and as reconciled by mode control unit 315.

For example, during operation of at least vehicle 230, energy distribution to RESS 231 may be prioritized over energy distribution to RESS 241, as energy available from onboard charger 231 is depleted. Thus, activation unit 320 may facilitate an operation mode transition from a default operation mode, in which energy is evenly distributed to RESS 231 and RESS 241, to a conservative mode for electrically powered accessory 240. In the conservative mode of operation therefore, electrically powered accessory 240 may resolve to a minimal level to ensure cargo integrity, while energy distribution from onboard charger 231 is prioritized towards RESS 232.

In accordance with the embodiments described and recited herein, there may be an operation mode contemplated by which energy distribution to RESS 241 is prioritized over energy distribution to RESS 232.

Further, the automated transition from the default mode of operation to either implementation of a conservative mode of operation may be based on levels of energy available from onboard charger 231 and threshold values of energy needed by either of RESS 232 and RESS 241. Alternatively, the manual transition from the default mode of operation to either implementation of a conservative mode of operation may be implemented via a user device that is communicatively connected to ePDU 210. An alert or prompt may be triggered when available energy or estimated runtime remaining reaches a pre-defined threshold. Recommendations of alternative operating modes may be included in the prompt, with information on estimated operating time remaining associated with each alternative mode.

As another example, during operation of at least vehicle 230 upon completing a recharging connection with ESE 220 and therefore the energy from onboard charger 231 has been replenished to some degree, activation unit 320 may facilitate a transition from an operation mode for one or both of vehicle 230 and electrically powered accessory 240 to an aggressive mode of operation. In an aggressive mode of operation, a depleted RESS 232 or RESS 241 may draw energy from onboard charger 231 at a rate higher than that of both the default mode and the conservative mode.

FIG. 4 illustrates an operational flowchart for distributing power in an electrical power delivery environment, in accordance with at least on embodiment described herein. As depicted, operational flow 400 includes functions executed by various components of controller 215 that may be included in ePDU 210 shown in FIG. 2. However, operational flow 400 is not limited to such components and processes, as obvious modifications may be made by re-ordering two or more of the sub-processes described here, eliminating at least one of the sub-processes, adding further sub-processes, substituting components, or even having various components assuming sub-processing roles accorded to other components in the following description. Operational flow 400 may include various operations, functions, or actions as illustrated by one or more of blocks 405, 410, 415, 417, and 420. These various operations, functions, or actions may, for example, correspond to software, program code, or program instructions executable by a digital processor that causes the functions to be performed. Processing may begin at either or both of block 405 and block 410.

Block 405 (Connect to Energy Source) may refer to controller 215 establishing or maintaining communicative connections with, respectively, vehicle 230 and electrically powered accessory 240, via respective sensors. By such communicative connection, cache 310 may receive and store information regarding energy needs for vehicle 230 and powered accessory 240, relative to various levels of energy available from onboard charger 231. Processing may proceed to either of block 410 or 415, depending on the embodiment.

Block 410 (Determine Operating Modes) may refer to mode control unit 315 receiving predetermined modes of operation, under various conditions pertaining to various levels of energy available from onboard charger 231, from an external source, e.g., user, network database, etc. Alternatively, block 410 may refer to model control unit 315 determining modes of operation for both vehicle 230 and electrically powered accessory 240 in real-time based on, at least, energy needs relative to various levels of energy available from onboard charger 231. Processing may proceed to block 415.

Block 415 (Receive Information re: Available Energy) may refer to cache 310 receiving, from sensors corresponding to vehicle 230, real-time levels of energy available from onboard charger 231. Processing may proceed to block 420, though in accordance with some alternative embodiments, processing may optionally proceed to block 417.

Block 417 (Customize/Modify Operating Mode(s)) may refer to mode control unit updating operation modes to be implemented based on incoming real-time information from either of vehicle 230 or electrically powered accessory 240. Alternatively, block 417 may refer to mode control unit updating operation modes to be implemented based on user input. Processing may proceed to block 420.

Block 420 (Determine Modes of Operation for Components), may refer to mode control unit 315 determining an appropriate mode of operation for both vehicle 230 and electrically powered accessory 240 based on, at least, information received from vehicle 230 and electrically powered accessory 240 regarding energy needs for various levels of operation and information received from vehicle 230 regarding energy available from onboard charger 231.

Block 420 may further refer to activation unit activating an appropriate mode of operation for vehicle 230 and electrically powered accessory 240 based on, at least, real-time information regarding energy available from onboard charger 231 relative to information stored in cache 310; or, alternatively, as instructed by a user.

Accordingly, transport climate control systems, in accordance with the embodiments described and recited herein, have their operation modified based on energy available thereto. The modifications in operation may be implemented manually or automatically. Thus, the embodiments described and recited herein prevent premature loss of function and mobility, when sharing an energy source with the transport unit, i.e., vehicle.

ASPECTS

It is to be appreciated that any of the following aspects may be combined:

Aspect 1. A computer-readable medium that stores executable instructions that, upon execution, cause an energy distribution controller, electrically connected to both an energy source and an electrical system, to render efficient energy allocation for the electrical system by performing functions comprising:

receiving energy requirements for the electrical system under various conditions;

receiving information indicating energy available from the energy source;

determining modes of operation for the electrical system for each of the various conditions that correspond the information indicating energy available and the energy requirements for the electrical system under each of the various conditions.

Aspect 2. The computer-readable medium of Aspect 1, wherein the electrical system provides energy for both:

a battery for a vehicle that is at least partially re-chargeable, and a climate control unit that is used in a transport climate-controlled system providing climate control to at least one of an internal space of the vehicle.

Aspect 3. The computer-readable medium of Aspect 1, wherein the electrical system provides energy for both:

a battery for a vehicle that is at least partially re-chargeable, and an electrically powered accessory that is configured to be used with at least one of a vehicle, a trailer, and a transport container.

Aspect 4. The computer-readable medium of Aspect 1 or Aspect 3, wherein the accessory is a climate control unit.

Aspect 5. The computer-readable medium of any one of Aspects 1-4, wherein the functions further comprise activating one of the determined modes of operation for the electrical system.

Aspect 6. The computer-readable medium of any one of Aspects 1-5, wherein the activating occurs automatically.

Aspect 7. The computer-readable medium of any one of Aspects 1-5, wherein the activating occurs manually.

Aspect 8. The computer-readable medium of any one of Aspects 1-7, wherein at least one of the various modes of operation includes prioritizing allocation of energy to the battery over allocation of energy to the climate-controlled system unit at least some of the various conditions.

Aspect 9. The computer-readable medium of any one of Aspects 1-8, wherein at least one of the various modes of operation for the electrical system includes prioritizing allocation of energy to the climate-controlled system over allocation of energy to the battery.

Aspect 10. The computer-readable medium of any one of Aspects 1-9, wherein the various conditions pertain to energy availability from the energy source.

Aspect 11. The computer-readable medium of any one of Aspects 1-9, wherein the various conditions pertain to electrical system needs for sustaining standard performance of at least one of the battery or the climate control unit.

Aspect 13. The computer-readable medium of any one of Aspects 1-12, wherein the energy distribution controller is associated with a vehicle that is at least partially re-chargeable and a climate control unit that is used in a transport climate-controlled system providing climate control to at least one of an internal space of the vehicle, an internal space of a trailer, and an internal space of a shipping container.

Aspect 14. A computer-readable medium that stores executable components that, upon execution, cause an energy distribution controller, electrically connected to both an energy source and an electrical system, to render efficient energy allocation for the electrical system, the components comprising:

a source meter configured to determine amounts of energy available from the energy source via a communicative connection;

a system cache configured to store energy requirements for the electrical system under various conditions;

a mode control unit configured to determine modes of operation for the electrical system under each of the various conditions that correspond the information indicating energy available and the energy requirements for the electrical system under each of the various conditions; and an activation unit to activate one of the determined modes of operation for the electrical system.

Aspect 15. The computer-readable medium of Aspect 14, wherein the electrical system provides energy for both:

a battery for a vehicle that is at least partially re-chargeable, and a climate control unit that is used in a transport climate-controlled system providing climate control to at least one of an internal space of the vehicle.

Aspect 16. The computer-readable medium of Aspect 14, wherein the electrical system provides energy for both:

a battery for a vehicle that is at least partially re-chargeable, and an electrically powered accessory that is configured to be used with at least one of a vehicle, a trailer, and a transport container.

Aspect 17. The computer readable medium of Aspect 14 or Aspect 16, wherein the accessory is a climate control unit.

Aspect 18. The computer-readable medium of any one of Aspects 14-17, wherein the activation unit activates the determined mode of operation automatically upon occurrence of one of the various conditions.

Aspect 19. The computer-readable medium of any one of Aspects 14-18, wherein the activation unit activates the determined mode of operation upon receipt of manual instructions.

Aspect 20. The computer-readable medium of any one of Aspects 14-19, wherein at least one of the various modes of operation includes prioritizing allocation of energy to the battery over allocation of energy to the climate-controlled system unit at least some of the various conditions.

Aspect 21. The computer-readable medium of any one of Aspects 14-20, wherein at least one of the various modes of operation for the electrical system includes prioritizing allocation of energy to the climate-controlled system over allocation of energy to the battery.

Aspect 22. The computer-readable medium of any one of Aspects 14-21, wherein the mode control unit is further configured to receive modes of operation for the electrical system for each of the various conditions from a user device.

Aspect 23. The computer-readable medium of any one of Aspects 14-22, wherein the various conditions pertain to energy availability from the energy source.

Aspect 24. The computer-readable medium of any one of Aspects 14-23, wherein the various conditions pertain to electrical system needs for sustaining standard performance of at least one component for at least the batter or the climate control unit.

Aspect 25. A method performed by an energy distribution controller that is connected to both an energy source and an electrical system that includes a battery of a vehicle that is at least partially re-chargeable and a climate control unit that is used in a transport climate-controlled system providing climate control to at least one of an internal space of the vehicle, the method comprising:
  receiving energy requirements for the battery and the climate control unit under various conditions;
  receiving information indicating amounts of energy available from the energy source; and
  determining modes of operation for the battery and the climate-controlled system under each of the various conditions, wherein the modes of operation,
    wherein at least one of the various modes of operation includes prioritizing allocation of energy to the battery over allocation of energy to the climate-controlled system unit at least some of the various conditions, and
    wherein at least one of the various modes of operation for the electrical system includes prioritizing allocation of energy to the climate-controlled system over allocation of energy to the battery.

Aspect 26. A method performed by an energy distribution controller that is connected to both an energy source and an electrical system that includes a battery of a vehicle that is at least partially re-chargeable and an electrically powered accessory that is configured to be used with at least one of a vehicle, a trailer, and a transport container, the method comprising:
  receiving energy requirements for the battery and the climate control unit under various conditions;
  receiving information indicating amounts of energy available from the energy source; and
  determining modes of operation for the battery and the climate-controlled system under each of the various conditions, wherein the modes of operation,
    wherein at least one of the various modes of operation includes prioritizing allocation of energy to the battery over allocation of energy to the climate-controlled system unit at least some of the various conditions, and
    wherein at least one of the various modes of operation for the electrical system includes prioritizing allocation of energy to the climate-controlled system over allocation of energy to the battery.

Aspect 27. The method of Aspect 26, wherein the accessory is a climate control unit.

The terminology used in this specification is intended to describe particular embodiments and is not intended to be limiting. The terms "a," "an," and "the," or even the absence of such modifiers, may refer to the plural forms as well, unless clearly indicated otherwise. The terms "includes," "including," "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. The word "embodiment" as used within this specification may, but does not necessarily, refer to the same embodiment. This specification and the embodiments described are examples only. Other and further embodiments may be devised without departing from the basic scope thereof, with the true scope and spirit of the disclosure being indicated by the claims that follow.

The invention claimed is:

1. A computer-readable medium that stores executable instructions that, upon execution, cause an energy distribution controller, electrically connected to both a utility-based energy source and a vehicle-based electrical system that provides energy for both a battery that is at least partially re-chargeable for a vehicle and a climate control unit used in a transport climate-controlled system providing climate control to at least one of an internal space of the vehicle, to render efficient energy allocation for the electrical system by performing functions comprising:
  receiving energy requirements for the electrical system under various conditions for recharging the battery and managing climate control to the internal space of the vehicle;
  receiving information indicating energy available from the utility-based energy source, which is connected to the electrical system via an energy power line;
  determining modes of operation for the electrical system for each of the various conditions that correspond the information indicating energy available and the energy requirements for the electrical system under each of the various conditions.

2. The computer-readable medium of claim 1, wherein the functions further comprise activating one of the determined modes of operation for the vehicle-based electrical system.

3. The computer-readable medium of claim 2, wherein the activating occurs automatically.

4. The computer-readable medium of claim 2, wherein the activating occurs manually.

5. The computer-readable medium of claim 1, wherein at least one of the various modes of operation includes prioritizing allocation of energy to the battery over allocation of energy to the climate-controlled system unit under at least some of the various conditions.

6. The computer-readable medium of claim 1, wherein at least one of the various modes of operation for the vehicle-based electrical system includes prioritizing allocation of energy to the climate controlled system over allocation of energy to the battery.

7. The computer-readable medium of claim 5, wherein the various conditions pertain to energy availability from the utility-based energy source.

8. The computer-readable medium of claim 5, wherein the various conditions pertain to electrical system needs for sustaining standard performance of at least one of the battery or the climate control unit.

9. The computer-readable medium of claim 1, wherein the energy distribution controller is associated with a vehicle that is at least partially re-chargeable and a climate control unit that is used in a transport climate-controlled system providing climate control to at least one of an internal space of the vehicle, an internal space of a trailer, and an internal space of a shipping container.

10. A computer-readable medium that stores executable components that, upon execution, cause an energy distribution controller, electrically connected to both a utility-based energy source and a vehicle-based electrical system that provides energy for both a battery that is at least partially re-chargeable for a vehicle and a climate control unit used in a transport climate-controlled system providing climate control to at least one of an internal space of the vehicle, to render efficient energy allocation for the vehicle-based electrical system, the components comprising:

a source meter configured to determine amounts of energy available from the utility-based energy source, via a communicative connection,
    wherein the utility-based energy source is connected to the vehicle-based electrical system via an energy power line;
a system cache configured to store energy requirements for the vehicle-based electrical system under various conditions for recharging the battery and managing climate control to the internal space of the vehicle;
a mode control unit configured to determine modes of operation for the vehicle-based electrical system under each of the various conditions that correspond the information indicating energy available and the energy requirements for the vehicle-based electrical system under each of the various conditions; and
an activation unit configured to activate one of the determined modes of operation for the electrical system.

11. The computer-readable medium of claim 10, wherein the activation unit activates the determined mode of operation automatically upon occurrence of one of the various conditions.

12. The computer-readable medium of claim 10, wherein the activation unit activates the determined mode of operation upon receipt of manual instructions.

13. The computer-readable medium of claim 10, wherein at least one of the various modes of operation includes prioritizing allocation of energy to the battery over allocation of energy to the climate-controlled system unit under at least some of the various conditions.

14. The computer-readable medium of claim 10, wherein at least one of the various modes of operation for the vehicle-based electrical system includes prioritizing allocation of energy to the climate-controlled system over allocation of energy to the battery.

15. The computer-readable medium of claim 10, wherein the mode control unit is further configured to receive modes of operation for the vehicle-based electrical system for each of the various conditions from a user device.

16. The computer-readable medium of claim 10, wherein the various conditions pertain to energy availability from the energy source.

17. The computer-readable medium of claim 10, wherein the various conditions pertain to electrical system needs for sustaining standard performance of at least one component for at least the batter or the climate control unit.

18. A method performed by an energy distribution controller that is connected to both a utility-based energy source and a vehicle-based electrical system that includes a battery of a vehicle that is at least partially re-chargeable and a climate control unit that is used in a transport climate-controlled system providing climate control to at least one of an internal space of the vehicle, the method comprising:
    receiving energy requirements for the battery and the climate control unit under various conditions for recharging the battery and managing climate control to an internal space of the vehicle;
    receiving information indicating amounts of energy available from the utility-based energy source,
        wherein the utility-based energy source is connected to the vehicle-based electrical system via an energy power line; and
    determining modes of operation for the battery and the climate-controlled system under each of the various conditions,
        wherein at least one of the various modes of operation includes prioritizing allocation of energy to the battery over allocation of energy to the climate-controlled system unit at least some of the various conditions, and
        wherein at least one of the various modes of operation for the electrical system includes prioritizing allocation of energy to the climate-controlled system over allocation of energy to the battery.

* * * * *